R. A. ROBERTS.
Improvement in Harvester-Droppers.
No. 128,564. Patented July 2, 1872.

Witnesses:
A Bennerkendorf.
Geo W. Mabee

Inventor:
R. A. Roberts
PER
Attorneys.

128,564

UNITED STATES PATENT OFFICE.

RICHARD A. ROBERTS, OF SALISBURY, MISSOURI.

IMPROVEMENT IN HARVESTER-DROPPERS.

Specification forming part of Letters Patent No. 128,564, dated July 2, 1872.

Specification describing a new and useful Improvement in Side-Dropping Dropper for Harvesters, invented by RICHARD A. ROBERTS, of Salisbury, in the county of Chariton and State of Missouri.

Figure 1:
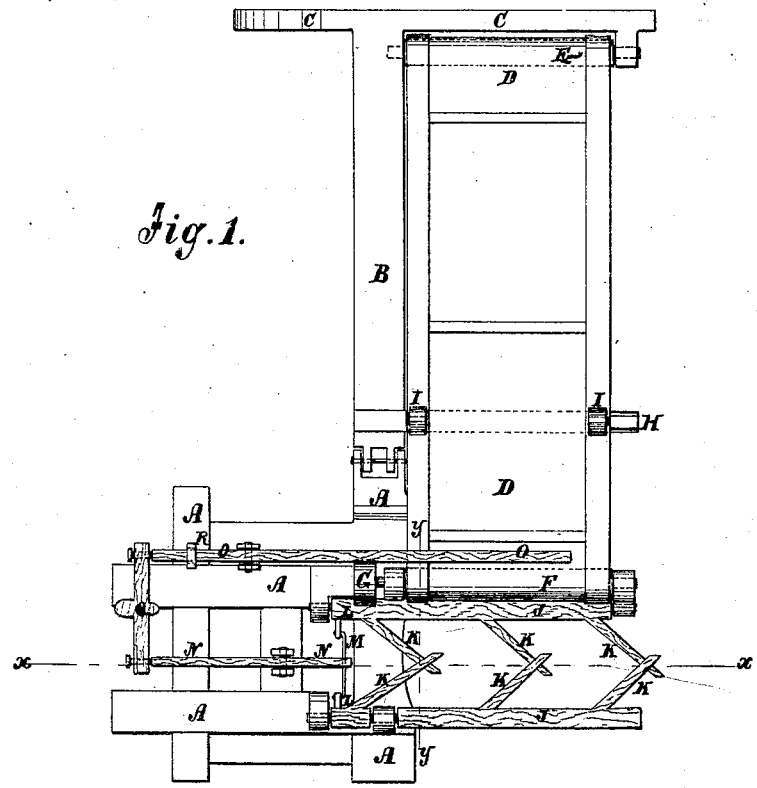
Figure 2:
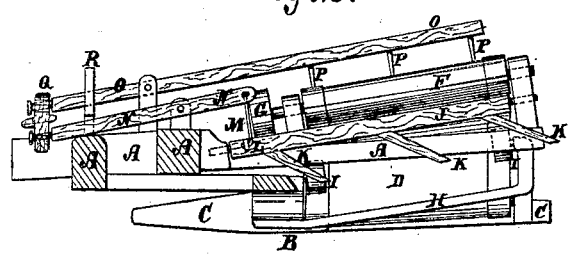
Figure 3:
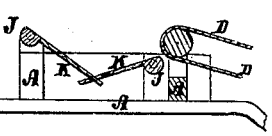

Figure 1 is a top view of my improved dropper, shown as attached to the frame-work of a harvester. Fig. 2 is a detail sectional view of the same taken through the line $x$ $x$, Fig. 1. Fig. 3 is a detail sectional view of the same taken through the line $y$ $y$, Fig. 1.

Similar letters of reference indicate corresponding parts.

My invention has for its object to furnish an improved side-dropper for harvesters, which shall be simple in construction, light, durable, not liable to get out of order, easily repaired, and which shall drop the grain in gavels at the side of the machine, so as to be entirely out of the way when making the next round; and it consists in the construction and combination of the various parts of the device, as hereinafter more fully described.

A represents the frame of the harvester; B, the finger-bar; and C, the outer finger or opener, about the construction of which parts there is nothing new. D is an endless-apron platform, made of canvas, stiffened by cross-bars; or of narrow belts having cross-bars attached to them. The endless platform D passes around a roller, E, the journals of which revolve in bearings attached to the rear part of the finger C. The endless platform D also passes around a roller, F, the journals of which revolve in bearings attached to the frame A. The roller F gives motion to the endless platform D, and is driven from the driving mechanism of the harvester by a gear-wheel shaft and friction-pulley, which are not shown in the drawing, and which operate upon a friction-pulley, G, attached to the forward journal of the said roller F. H is a bar attached to the finger-bar B, near its inner or hinged end, to the outer and inner parts of which are pivoted the small rollers or wheels I, beneath which the endless platform D passes, as shown in Fig. 1, to keep the part of the endless platform D that receives the grain from the cutter-bar parallel with said bar. From the pulleys I the endless platform D passes up to the roller F, which is placed at such a height that as the endless platform D passes over said roller the grain may fall from said platform into the receiver. J are two bars placed at such a distance apart as to conveniently receive between them enough grain to form a gavel, which grain rests while being collected from the endless platform D upon the inwardly-projecting bars K, attached to the bars J, and which should be of such a length that their ends may overlap, as shown in Figs. 1 and 3, when raised to receive the grain. The bars K should be attached to the bars J, with their free ends projecting to the rearward, so that when turned down to discharge the gavels, they may not catch upon the ground or upon the stubble or other obstructions. To the inner sides of the bars J, near their forward ends, are attached short rigid arms, L, to the ends of which are attached the ends of a short rope or chain, M, to the center of which is attached one end of a lever, N, which is pivoted to the frame A, or to a support attached to said frame, so that by operating the lever N, the bars J K may be raised to receive the grain, and allowed to drop to discharge the gavel. O is a lever, projecting across the endless platform D, at or near the roller F, and to its lower side are attached teeth P, to stop the grain while the bars J K are being lowered to discharge the gavel. The lever O is pivoted to the frame A, or to a support attached to said frame. The levers N and O are parallel, or nearly parallel, with each other, and their forward ends are pivoted to the opposite ends of a foot-bar, Q, so that the driver by a single movement of his foot may raise the bars K to receive the grain, and the rake O P to allow the grain to pass off the endless platform D to the receiver J K, and by removing or raising his foot can allow the bars K to drop to discharge the grain, and the rake O P to drop to prevent it from passing off the endless platform D. With the lever O is connected a stop, R, attached to the frame A to prevent the rear end of the lever O from ever dropping so low as to bring the teeth P in contact with the endless platform D.

Having thus described my invention, I claim as new and desire to secure by Letters Patent—

The combination of the arms L, rope or chain M, lever N, lever O, teeth P, and foot-bar Q, with each other and with the bars J K, endless platform D, frame-work A, and finger-bar B of a harvester, substantially as herein shown and described, and for the purpose set forth.

RICHARD A. ROBERTS.

Witnesses:
 JOHN HUTCHINSON,
 EDWIN P. AMMERMAN.